Figure 1:
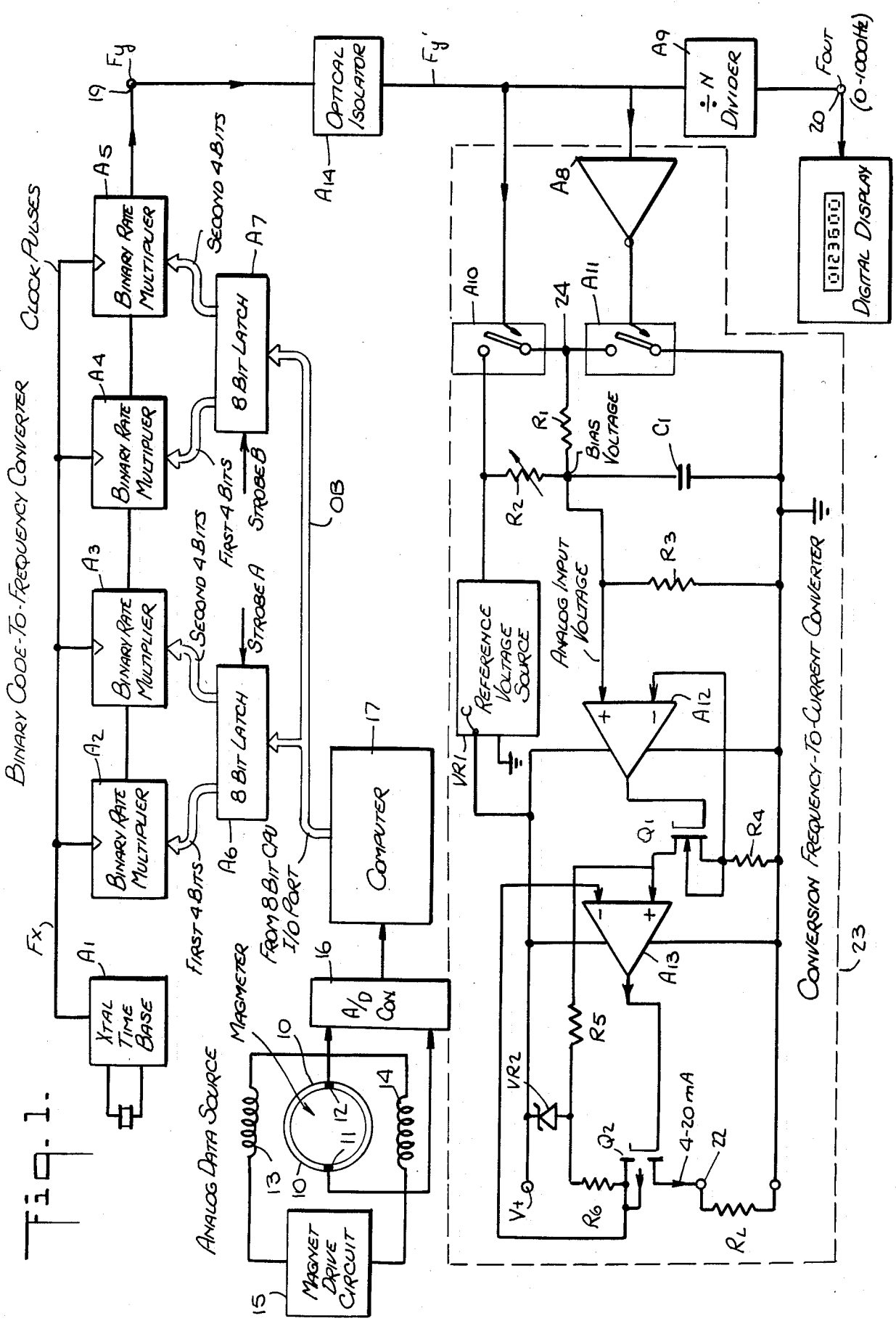

United States Patent [19]

Shauger

[11] Patent Number: 4,562,547
[45] Date of Patent: Dec. 31, 1985

[54] COMPUTER DATA BUS COMPATIBLE CURRENT AND FREQUENCY OUTPUT SYSTEM

[75] Inventor: Herbert A. Shauger, Doylestown, Pa.

[73] Assignee: Fischer & Porter Company, Warminster, Pa.

[21] Appl. No.: 479,321

[22] Filed: Mar. 28, 1983

[51] Int. Cl.$^4$ ............................................. G01R 23/02
[52] U.S. Cl. .................................... 364/484; 364/510; 364/550
[58] Field of Search ............... 364/484, 550, 518, 504, 364/571, 510; 375/62

[56] References Cited

U.S. PATENT DOCUMENTS

| | | | |
|---|---|---|---|
| 4,107,600 | 8/1978 | McMannis | 364/484 X |
| 4,192,005 | 3/1980 | Kurtz | 364/571 |
| 4,251,869 | 2/1981 | Shaffer | 364/484 |
| 4,387,434 | 6/1983 | Moncrief, Jr. et al. | 364/509 |
| 4,390,957 | 6/1983 | Skarlos et al. | 364/550 |
| 4,437,164 | 3/1984 | Branch, III | 364/571 |

Primary Examiner—Edward J. Wise
Attorney, Agent, or Firm—Michael Ebert

[57] ABSTRACT

A system operating in conjunction with a computer whose central processing unit is adapted to process data fed thereto by a variable data source to yield at its output port, parallel binary-coded data having an even number of bits which are supplied to a data bus. The system is coupled to the data bus and includes a series of binary rate multipliers to convert the binary-coded data to a conversion frequency which is divided to provide an output frequency in a range suitable for indicating the variable data and which is at the same time converted to an output current proportional to the variable data. The output frequency and output current are electrically isolated from the computer and its associated data source to avoid any interaction therewith.

11 Claims, 2 Drawing Figures

COMPUTER DATA BUS COMPATIBLE CURRENT AND FREQUENCY OUTPUT SYSTEM

BACKGROUND OF INVENTION

Field of Invention

This invention relates to a system operating in conjunction with a computer whose central processing unit manipulates data fed thereto by a variable data source to yield at its output port parallel binary-coded data, the system converting this data both to an output frequency in a range suitable for indicating the variable input data, and to an output current proportional thereto.

More particularly, the invention deals with a system of the above-noted type in which the output frequency and the output current are electrically isolated from the computer and its associated data source to avoid any interaction therewith.

In industrial process control operations, it is often necessary to transmit data obtained at various field stations to a remote indicating or control terminal where the information is processed by the central processing unit of a digital computer. The data conveyed from the variable data sources at the field stations to the receiving terminal may be changes in pressure, temperature, flow rate or any other process variable. Such variable data is usually derived by means of a low level instrument which senses the variable and generates a corresponding electrical analog signal.

In a multiplexing system associated with a digital computer the analog data to be processed must first be converted into corresponding digital signals. A multiplexer makes it possible to share a common information path among several groups of input or output digital devices. By such means, data can be transmitted between a digital processing unit and any one of several digital input or output devices.

In many industrial process control applications, an analog output as well as a frequency output to provide a digital readout is required in order to carry out various control functions. Thus in a typical process control loop where the final control element is a valve governed by an analog signal and the related recorder is a moving chart pen recorder which also requires an analog operating signal, the digital output from the computer which is a function of the sensed input data from the control loop must be converted into analog form. In the United States, the most commonly accepted analog output for process control and recording purposes is a current lying in a 4 to 20 mA (dc) range. Also in use, however, is a 10 to 50 Ma range as well as a zero-based current output, such as 0 to 16 mA and 0 to 20 mA.

The frequency output is not only necessary to afford a digital readout of flow rate or whatever other variable is being monitored, but also for purposes of totalization, such totalization being necessary for billing or other purposes to determine the total flow that has passed through the meter.

In a computerized system of the above type, it is desirable to electrically isolate both the frequency output and the current output from the computer and its associated variable data source to avoid any interaction therebetween. Industrial applications which make use of a flowmeter as the variable data source often require an isolated frequency and current output for accurate flow rate indication and totalization. Since accurate outputs require 12 to 16 bits of precision, isolation of the individual bits of parallel binary-coded data yielded by the microprocessor is an unrealistic and impractical solution to this problem.

SUMMARY OF INVENTION

In view of the foregoing, the main object of this invention is to provide in conjunction with a computer whose control processing unit is adapted to process digital input data and whose output port yields parallel binary-coded data having an even number of bits which is applied to a data bus, a system coupled to said data bus to convert the binary-coded data both to an output frequency suitable for indicating the variable input data and to a direct current proportional to the input data.

A significant feature of the invention is that the output frequency and output current are electrically isolated from the computer and the associated data source, thereby obviating the need for isolating the individual bits of coded binary data.

More particularly, an object of the invention is to provide a system usable with a variable data source such as an electromagnetic flowmeter which generates an analog voltage, the system converting this voltage into a digital value which is applied to the input of the computer.

Also an object of the invention is to provide a system of the above type which is of relatively simple and inexpensive design and which operates efficiently and reliably.

Briefly stated, these objects are attained in a system operating in conjunction with a computer whose central processing unit is adapted to process data fed thereto by a variable data source to yield at its output port, parallel binary-coded data having an even number of bits which are supplied to a data bus. The system is coupled to the data bus and includes a series of binary rate multipliers to convert the binary-coded data to a conversion frequency which is divided to provide an output frequency in a range suitable for indicating the variable data and which is at the same time converted to an output current proportional to the variable data. The output frequency and output current are electrically isolated from the computer and its associated data source to avoid any interaction therewith.

OUTLINE OF THE DRAWINGS

Figure 2:
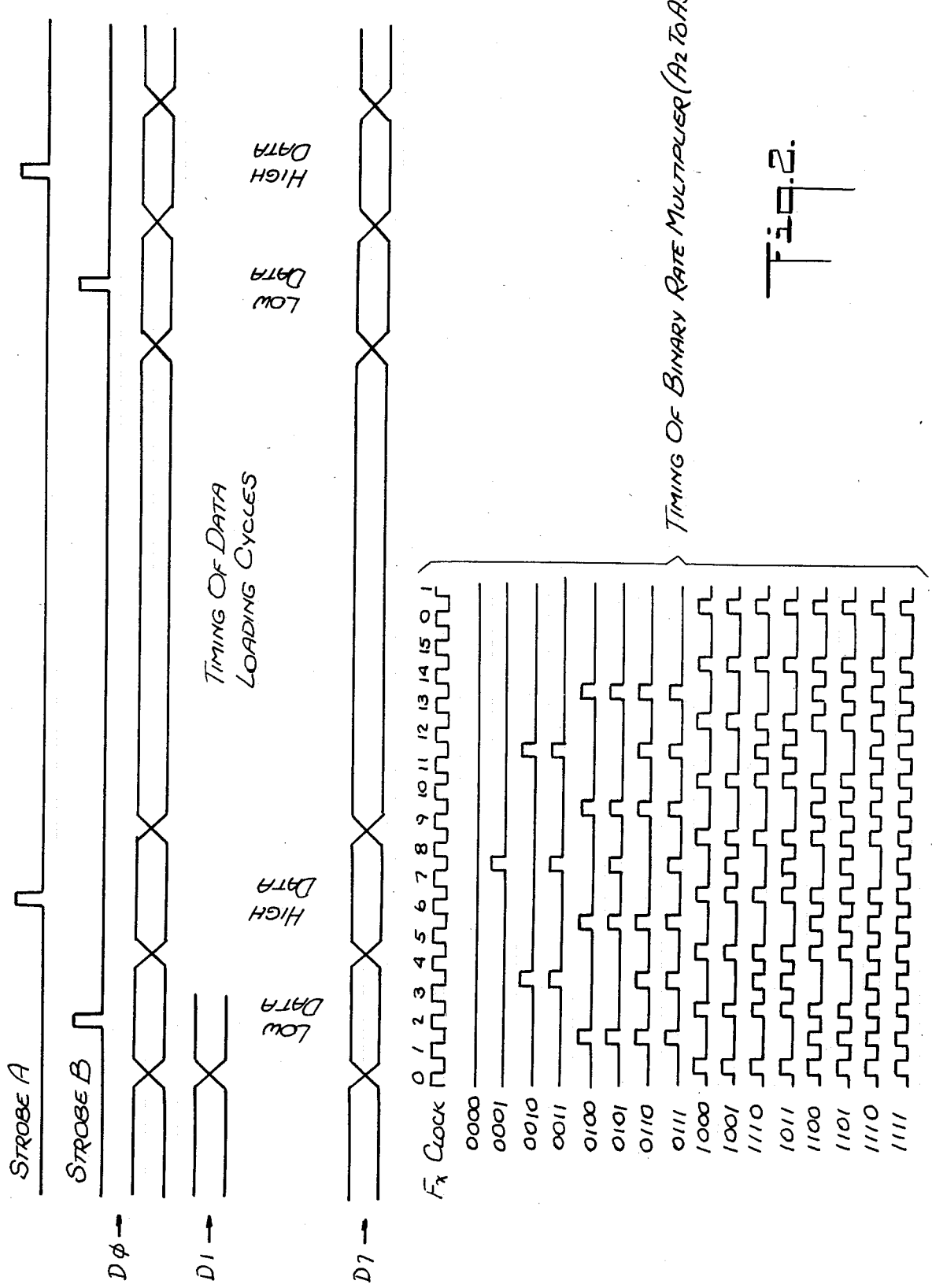

For a better understanding of the invention as well as other objects and further features thereof, reference is made to the following detailed description to be read in conjunction with the accompanying drawings, wherein:

FIG. 1 is a schematic circuit diagram of a system in accordance with the invention operating in conjunction with a computer and a variable data source in the form of an electromagnetic flowmeter to produce electrically isolated frequency and current outputs; and FIG. 2 is a timing diagram of the system.

DESCRIPTION OF THE INVENTION

Referring now to FIG. 1, there is shown a system in accordance with the invention including a digital computer 17 arranged to receive in sequential order data generated by a group of data sources, each yielding an analog voltage representing a variable of interest, such as changes in temperature, pressure, liquid level flow rate. The computer processes the data derived from each source to produce output data in parallel binary-coded form.

The present invention is of particular value in connection with a variable data source constituted by an electromagnetic flowmeter which generates a voltage proportional to the flow rate of the fluid being metered thereby. Hence in FIG. 1 the data source is represented by an electromagnetic flowmeter whose flow tube 10 is provided with a pair of diametrically-opposed electrodes 11 and 12 which lie on an axis normal to the longitudinal flow axis of the tube. A pair of electromagnets 13 and 14 are disposed on opposite sides of the tube 10 which, when excited by magnet drive circuit 15, create an electromagnetic field whose lines of flux are generally perpendicular to the electrode axis. In operation, a fluid coursing through the tube intersects the electromagnetic field to induce an analog signal in the electrodes proportional to flow rate.

In order for computer 17 to process the analog voltages from the group of flowmeters linked thereto, each voltage must first be converted into corresponding digital data, this being carried out by A/D converter 16. An A/D converter suitable for this purpose is disclosed in U.S. Pat. No. 4,339,958, entitled ANALOG-TO-DIGITAL CONVERTER FOR ELECTROMAGNETIC FLOWMETER, whose entire disclosure is incorporated herein by reference.

The function of a system in accordance with the invention is to translate the parallel coded-binary data of computer 17 which appears on its CPU output port into simultaneous current and frequency outputs which are electrically isolated from the computer and the data sources associated therewith. Thus in the case of a data source constituted by an electromagnetic flowmeter installed in an industrial process control loop, the system yields a frequency output (Fout) proportional to the flow rate being metered, this frequency output being suitable for accurate totalization, or for flow rate indication in a digital display indicator 18. At the same time, the system yields a 4–20 mA direct current proportional to the analog voltage signal generated by the flowmeter, current in the range being suitable for telemetering to a remote station represented by a load resistor $R_L$.

While the invention is illustrated as it operates in conjunction with an electromagnetic flowmeter as the data source, it is to be understood that it is applicable to any data source in the form of a low level instrument yielding an analog voltage as a function of the variable of interest.

A typical digital computer consists of a central processing unit (CPU), a memory and input/output (I/0) ports. The central processing unit may be a microprocessor embodied on an integrated circuit chip, this unit acting to carry out arithmetic and logical operations on binary data entered therein. The memory stores the coded pieces of information or instructions which direct the activities of the CPU as well as the coded binary data that is to be manipulated in this unit. Each of the locations in the memory is identified by an address number.

It is not always possible for the CPU to perform its required tasks by recalling data stored in memory. This limitation is resolved by providing the computer with input ports which can be addressed by the CPU and input the data contained therein. Also required are addressable output ports permitting the CPU to communicate the result of its processing to peripheral devices.

Input and output operations are similar to memory read and write operations, save that a peripheral I/0 device is addressed rather than a memory location. The CPU issues the appropriate input or output control signal, it sends the proper device address, and either receives the data being inputed or sends the data to be outputed.

Thus the CPU unifies the computer, for it governs the functions performed by the other components. In operation, the CPU fetches instructions from memory and decodes their binary content in order to execute them. It is able to reference memory and I/0 ports to the extent necessary to execute instructions, and it is able to recognize and respond to external control signals such as "interrupt" and "wait" requests.

Data can be presented at the input/output in either parallel or serial form. All data is represented in binary-coded form. A binary data word consists of a group of bits, each bit being either a "one" or a "zero." Parallel I/0 consists of all bits in a word printed at the same time, one bit per line, whereas serial I/0 consists of transferring one bit at a time on a single line.

Computer 17 may be constituted by the Intel Corporation (Santa Clara, Calif.) 8080 Microcomputer System which is disclosed in the Sept. 1975 Instruction Manual published by this company. The 8080 Central Processing Unit is a complete 8-bit parallel unit for use in general purpose digital computer systems and is fabricated on a single LSI chip. This CPU unit transfers data and internal information present at an output port via an 8-bit data bus ($D_0$–$D_7$), hereinafter identified in FIG. 1 as output bus OB. Given the proper instruction, the CPU will place the contents of the $D_0$ through $D_7$ data on these lines.

In a system in accordance with the invention, the two 8-bit words of binary-coded data from the CPU output port carried on output bus OB must first be translated into a frequency Fy representing the value of this data. For this purpose, use is made of a crystal-controlled time base A1 which supplies clock pulses to a series of binary rate multipliers A2, A3, A4 and A5 connected in cascade relation and operating in the "add" mode.

In order to derive frequency Fy from the CPU's 8 bit I/0 port, the two 8-bit words of coded output data carried by output bus OB is applied to a pair of 8-bit latches A6 and A7. Latch A6 is controlled by strobe line A, and latch A7 by strobe line B. These strobe lines are activated by an output operation of the CPU.

The 8-bit output of latch A6 (most significant data) is divided between the inputs of binary rate multipliers A2 and A3, the first 4 bits going to multiplier A2 and the second 4 bits to multiplier A3. In a like manner, the 8-bit output of latch A7 (least significant data) is fed to the inputs of binary rate multipliers A4 and A5. In practice, these multipliers may be constituted by 4-bit CMOS type CD4089 chips, but similar devices are available in other families, notably the TTL type Ser. No. 7497. The multipliers A2 to A5 connected in the "add" mode are all operated from the common time base A1.

FIG. 2 is the waveform timing diagram of the binary code-to-frequency conversion operation; the first two lines in the upper section of this diagram showing the relationship of strobe A to strobe B, below which is the timing of the data loading cycles for the 8-bit data $D_0$ to $D_7$.

The timing diagram in the lower section illustrates the timing relationship of the clock pulses from the crystal-controlled time base A1 to the four-bit binary code applied to each four-bit binary rate multiplier. The respective four bit binary code values are represented in the left side column by 0000; 0001; 0010; 0011, etc. The time base pulse rate is represented by symbol $F_x$.

In the "add" mode, output $F_y$ from the cascade connected 4-bit binary rate multipliers is expressed by the equation:

$$F_y = F_x * (N3/16 + N2/256 + N1/4096 + N0/65536)$$

(The term N or "nibble" describes a half byte.)

If, therefore, the 4-bit binary value "1111" is applied to each of the multipliers A2 to A5, the binary input thereto then is composed of sixteen "1"s. The output frequency will then be 65535/65536*$F_x$, and will decrease linearly in accordance with the binary inputs calculated in the computer.

It is to be noted in the timing diagram that for any binary input code, the duty cycle of the output is always directly proportional thereto. Thus, the clock pulses are numbered from 0 to 15, and for every 16 clock pulses cycle, a binary input of 0001 will produce a single output pulse; binary 0010 will produce two output pulses; binary 0011 will produce three output pulses; binary 1100 will produce four output pulses, and binary 0101 will produce five output pulses, and so on.

If, therefore, the clock input has a stable and known duty cycle (i.e., a square wave), then the output of the multiplier chain will be high 0.5* (N/16) of the time period between sixteen successive clock pulses, where N is the binary input to the multiplier. With the multipliers connected in cascade, this duty cycle relationship will follow, so that for a binary input of 4000 counts out of a possible full scale of 65535, the output duty cycle at $F_y$ will be 0.5* (4000/65536) when using a square wave clock pulse generator.

Thus output terminal 19 of the binary rate multiplier chain yields output frequency $F_y$ which represents the value of the 16-bit binary code output of the CPU in computer 17.

Since frequency $F_y$ lies within a relatively high range, it is necessary in practice, before indicating this frequency, to divide it down to a more useful range, such as 0 to 1000 Hz for the typical flowmeter applications, zero $H_z$ then representing no flow, and 1000 Hz, maximum flow.

To this end, frequency $F_y$ appearing at terminal 19 is applied through an optical isolator A14 to a frequency divider A9 to provide at terminal 20 a frequency output Fout in the desired low-frequency range. In practice, isolator A14 consists of a light-emitting diode to which the $F_y$ pulses are applied to produce light signals at the same rate which are picked up by a photodetector yielding corresponding electrical signals $F_y'$, thereby isolating frequency Fout at output terminal 20 from computer 17 and its associated data sources.

In order to convert the duty cycle signal $F_y'$ to a proportional analog current at output terminal 22 in the 4 to 20 mA range, or whatever other range is desired, a pulse-to-current converter is provided, the circuit of which is enclosed in dashed-line block 23.

Converter 23 includes a pair of electronic analog switches A10 and A11, switch A10 being actuated directly by the $F_y'$ pulses and switch A11 being actuated by these pulses through amplifier A8. These switches act to produce a signal with a known duty cycle and a stable amplitude derived from a reference voltage source VRI. The input of source VRI is connected relative to ground to a constant voltage supply V+ supplying power to operational amplifiers A12 and A13. The output of amplifier A12 is applied to an N-channel mosfet $Q_1$, while the output of amplifier A13 is applied to a P-channel mosfet $Q_2$.

The output of analog switches A10 and A11, is taken at terminal 24 from the junction of these series-connected switches, and this output contains an undesired ac component. This is smoothed by a filter composed of resistor $R_1$ and capacitor $C_1$, the smoothed output being applied to the non-inverting (+) input operational amplifier A12.

If the current output of converter 23 is to be other than zero (i.e., 4 to 20 mAdc), bias is added to the non-inverting (+) input of amplifier A12 by variable resistor $R_2$ connected between the output of reference voltage source VRI and the (+) input, a fixed resistor $R_3$ being connected between this input and ground. Thus a minimum bias voltage whose magnitude is determined by adjustment of resistor $R_2$ is developed across fixed resistor $R_3$. This bias is applied to the non-inverting (+) input of operational amplifier A12.

Accordingly, applied to the non-inverting input of operational amplifier A12 is a dc voltage directly proportional to the parallel coded-binary data from the CPU I/0 port. The inverting or (−) input of amplifier A12 is connected to the source contact of the N-channel mosfet $Q_1$. Amplifier A12 seeks to force the voltage developed across resistor $R_4$ connected between this contact and ground so as to equal the voltage developed across resistor $R_3$.

This state of equality can only arise when a constant current flows through resistor $R_4$ and through a resistor $R_5$ connected between the drain contact of mosfet $Q_1$ and the V+ terminal through a zener diode $VR_2$.

The voltage then developed across resistor $R_5$ is applied to the non-inverting (+) input of operational amplifier A13 which in turn seeks to force the P-channel mosfet $Q_2$ connected to the output of this amplifier to regulate the passage of current through resistor $R_6$ connected between the drain contact of mosfet $Q_2$ and the junction of resistor $R_5$ and zener diode $VR_2$.

When the voltage developed across resistor $R_6$ equals that across resistor $R_5$, amplifier A13 will be satisfied and a constant current will then be produced across load resistance $R_L$. The use of zener diode VR2 permits amplifier A13 to work below its positive common mode voltage limit. Typically it only needs to be 4 volts when the voltage at V+ is 24 volts.

To assure proper operation, certain circuit design considerations must be taken into account. First, as new data is inputed, there will be a slight output discontinuity. All such irregularities will be purged within 16 clock cycles. Therefore, the two data strobe pulses A and B should follow each other in rapid succession and the time consumed by the sixteen clock cycles should only be a small fraction of the time between updating intervals. Second, the maximum clock rate coming from multiplier A5 must not be so great that the duty cycle waveform will be lost in optical isolator A14. Optical isolators generally have response times of a few tenths of a microsecond, and this time should be only a small fraction of the output period of multiplier A5 at maximum frequency.

A salient feature of the invention is that it offers a precision output with a minimum number of connections between the operating components thereof. Thus in a typical practical application which requires at least 12 bits of computational precision, most commercially available microprocessors have 16 bits of data (two 8 bit bytes or words). Hence most CPU results will be in a 16 bit binary form and require double byte data transfer to the output device(s) or from the input device(s). The present invention makes it possible to read a 16 bit input and calculate a 16 bit output in a relatively simple manner.

While there have been shown and described preferred embodiments of a computer data bus compatible current and frequency output system in accordance with the invention, it will be appreciated that many changes and modifications may be made therein without, however, departing from the essential spirit thereof. Thus instead of a 16-bit coded binary output, the computer CPU may be of the 12-bit coded output type, in which event the binary rate multipliers would be of the 6-bit type, and the latches A6 and A7 would then divide the 12-bit output into six-bit segments.

I claim:

1. In combination with a computer whose central processing unit is adapted to process digital input data, the unit yielding at its output port parallel binary-coded data having an even number of bits which is applied to a data bus, a system operative with a variable data source generating input data in analog form and coupled to said bus to convert the binary-coded data to an output frequency suitable for indicating the variable data in a manner electrically isolating the output frequency from the computer and its associated data source, said system comprising:
   A. means to convert the analog data from the source into digital data and to feed it into the input of the computer, whereby the binary data on the output bus represents the source data;
   B. multiplier means to convert the binary-coded data on said bus to a conversion frequency that represents the binary-coded data;
   C. a frequency divider; and
   D. an optical isolator to apply the conversion frequency to said divider to yield said output frequency.

2. The combination as set forth in claim 1, wherein said data source is an electromagnetic flowmeter which yields an analog voltage proportional to flow rate, and wherein said output frequency lies in a range whose lowest frequency represents zero flow and whose highest frequency represents maximum flow.

3. The combination as set forth in claim 2, further including means coupled to the output of said isolator to convert the conversion frequency to a direct current proportional thereto.

4. The combination as set forth in claim 3, wherein said frequency-to-direct current converter includes a pair of analog switches connected in series across the output of a d-c reference voltage source, said switches being actuated in accordance with said conversion frequency, the voltage developed at the junction of the switches being filtered to produce a d-c analog voltage as a function of said conversion frequency.

5. The combination as set forth in claim 4, further including means to convert said d-c analog voltage into a corresponding current.

6. The combination as set forth in claim 5, wherein the means to convert the d-c analog voltage to a corresponding current includes a pair of operational amplifiers, each having an inverting and a non-inverting input, the d-c voltage being applied to the non-inverting input of the first amplifier whose output is connected through an N-channel mosfet to the non-inverting input of the second amplifier whose ouput is applied through a P-channel mosfet to an output terminal to yield said current.

7. The combination as set forth in claim 6, wherein the source of the N-channel mosfet is connected to the inverting input of the first amplifier and the drain of the P-channel mosfet is connected to the inverting input of the second amplifier.

8. The combination as set forth in claim 1, wherein said binary-coded data has sixteen bits.

9. The combination as set forth in claim 8, wherein said multiplier means includes a series of four binary rate multipliers in cascade relation controlled by clock pulses generated by a common time base.

10. The combination as set forth in claim 9, wherein each multiplier is a four-bit multiplier, and further including a pair of 8-bit latches coupled to the data bus, one latch dividing the 8-bit binary-coded data into two four-bit segments, one being applied as an input to the first multiplier and the other to the input of the second multiplier in the series thereof, the second latch acting in a like manner to apply the two four-bit segments to the respective inputs of the third and fourth multipliers in the series thereof.

11. In combination as set forth in claim 10, wherein said latches are controlled at separated intervals by respective strobe lines.

* * * * *